US009910779B2

United States Patent
Tani et al.

(10) Patent No.: US 9,910,779 B2
(45) Date of Patent: Mar. 6, 2018

(54) ARITHMETIC PROCESSING APPARATUS AND CONTROL METHOD THEREFOR

(71) Applicant: FUJITSU LIMITED, Kawasaki-shi, Kanagawa (JP)

(72) Inventors: Yoshimasa Tani, Kawasaki (JP); Shuji Yamamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 14/599,596

(22) Filed: Jan. 19, 2015

(65) Prior Publication Data
US 2015/0212939 A1    Jul. 30, 2015

(30) Foreign Application Priority Data

Jan. 29, 2014 (JP) .................................. 2014-014390

(51) Int. Cl.
G06F 12/084 (2016.01)
G06F 12/0855 (2016.01)
(Continued)

(52) U.S. Cl.
CPC ............ *G06F 12/084* (2013.01); *G06F 9/544* (2013.01); *G06F 12/0859* (2013.01); *G06F 15/167* (2013.01); *G06F 2212/62* (2013.01)

(58) Field of Classification Search
None
See application file for complete search history.

(56) References Cited

U.S. PATENT DOCUMENTS 6,442,631 B1 *  8/2002  Neufeld ................. G06F 13/18
                                                   710/107
6,463,509 B1 * 10/2002  Teoman ................ G06F 9/4401
                                                   711/113
(Continued)

FOREIGN PATENT DOCUMENTS

EP         2257876 A1    12/2010
JP         10-254775      9/1998
(Continued)

OTHER PUBLICATIONS

Extended European Search Report dated Jul. 10, 2015 for corresponding European Patent Application No. 15152249.7, 7 pages.
Japanese Office Action dated Jun. 27, 2017 for corresponding Japanese Patent Application No. 2014-014390, with Partial English Translation, 6 pages.

*Primary Examiner* — Midys Rojas
*Assistant Examiner* — Stephanie Wu
(74) *Attorney, Agent, or Firm* — Fujitsu Patent Center (57) ABSTRACT

An arithmetic processing apparatus has OS arithmetic processing unit executing instruction of OS, general-purpose arithmetic processing units each executing an instruction other than OS, a shared cache unit including a shared cache memory, a cache control unit and a request selection circuit which selects a memory access request from the arithmetic processing units, and a data buffer temporarily storing data of the memory access request, and a memory access control unit controlling a memory access to a main memory. The shared cache unit has a memory access band control register to which either one or both of a first set value, which includes an entry criterion for the request selection circuit to enter the memory access request from OS arithmetic processing unit, and a second set value which sets a capacity of a storage area in the data buffer for storing the data are set.

7 Claims, 4 Drawing Sheets

(51) Int. Cl.
*G06F 15/167* (2006.01)
*G06F 9/54* (2006.01)

(56) References Cited

U.S. PATENT DOCUMENTS

| | | | |
|---|---|---|---|
| 2008/0108899 | A1 | 5/2008 | Halmann et al. |
| 2009/0138683 | A1* | 5/2009 | Capps, Jr. ............ G06F 9/30101 712/220 |
| 2010/0017592 | A1 | 1/2010 | Yamada |
| 2010/0095040 | A1 | 4/2010 | Nishita et al. |
| 2010/0312968 | A1* | 12/2010 | Hikichi ............... G06F 12/0855 711/130 |
| 2011/0055480 | A1 | 3/2011 | Guyetant et al. |
| 2011/0078799 | A1 | 3/2011 | Sahita et al. |
| 2012/0079235 | A1 | 3/2012 | Iyer et al. |
| 2012/0221795 | A1 | 8/2012 | Hoshaku et al. |
| 2013/0173883 | A1* | 7/2013 | Cho .................... G06F 12/1009 711/207 |
| 2014/0019690 | A1 | 1/2014 | Hikichi et al. |

FOREIGN PATENT DOCUMENTS

| | | |
|---|---|---|
| JP | 2008-114065 | 5/2008 |
| JP | 2009-015509 | 1/2009 |
| JP | 2010-140146 | 6/2010 |
| JP | 2011-070654 | 4/2011 |
| JP | 2012-22616 A | 2/2012 |
| WO | 2012127628 A1 | 9/2012 |

* cited by examiner

ARITHMETIC PROCESSING APPARATUS AND CONTROL METHOD THEREFOR

CROSS-REFERENCE TO RELATED APPLICATION

This application is based upon and claims the benefit of priority of the prior Japanese Patent Application No. 2014-014390, filed on Jan. 29, 2014, the entire contents of which are incorporated herein by reference.

FIELD

The present invention relates to an arithmetic processing apparatus and a control method therefor.

BACKGROUND

A CPU chip (Central Processing Unit chip: arithmetic processing apparatus) in recent years includes a plurality of CPU cores (arithmetic processing units), in which the plurality of CPU cores execute user program instructions in parallel to increase an arithmetic speed. Further, there has been proposed a CPU chip of a heterogeneous configuration in which a plurality of general-purpose CPU cores executing user program instructions are mixed with a plurality of OS-dedicated CPU core executing instructions of an OS (Operating System), that is, basic software. In the above CPU chip, the plurality of general-purpose CPU cores process a complicated calculation instruction of the user program to enhance calculation processing efficiency, and the OS-dedicated CPU core executes interruption processing and a memory access associated with data copy in the OS, so as to prevent a useless processing delay and a disturbance in the parallel calculation processing by the general-purpose CPU cores.

The CPU chip is disclosed in, for example, Japanese Laid-open Patent Publication No. 2009-15509, Japanese Laid-open Patent Publication No. 10-254775, Japanese Laid-open Patent Publication No. 2008-114065, Japanese Laid-open Patent Publication No. 2010-140146, and Japanese Laid-open Patent Publication No. 2011-070654.

In such a multi-core CPU chip of a heterogeneous configuration, memory access bands are separately provided for the general-purpose CPU cores that execute calculation processing and the OS-dedicated CPU core, so that processing does not influence each other. Typically, at the stage of designing the CPU chips, each cache memory is separately allocated for the general-purpose CPU cores and the OS-dedicated CPU core, to optimize the memory access bands for the general-purpose CPU cores and the OS-dedicated CPU core according to the capacity of the cache memory.

However, the optimal frequencies of memory access requests produced by the OS-dedicated CPU core are variously different according to use states, and therefore, it is difficult to optimize an amount of resources for a memory access by the OS-dedicated CPU core, at the design stage of the CPU chip. Although preferential execution is needed for the memory access from the OS-dedicated CPU core, which is important because of relating to interruption processing etc., if a memory access band from the OS-dedicated CPU core is designed to be too wide, congestion may occur in memory accesses in calculation processing by the general-purpose CPU cores, which may disable to increase memory access efficiency in the overall multi-CPU cores.

SUMMARY

On aspect of the present embodiment is an arithmetic processing apparatus comprising an OS arithmetic processing unit which executes an instruction included in an Operating System a plurality of general-purpose arithmetic processing units each executing an instruction included in a program other than the Operating System a shared cache unit including a shared cache memory, which is shared among the plurality of general-purpose arithmetic processing units and the OS arithmetic processing unit, a cache control unit and a request selection circuit which selects a memory access request among memory access requests from the plurality of general-purpose arithmetic processing units and the OS arithmetic processing unit to enter into the cache control unit, and a data buffer which temporarily stores data corresponding to the memory access request and a memory access control unit which controls a memory access to a main memory, wherein the shared cache unit further has a memory access band control register to which either one or both of a first set value, which includes an entry criterion for the request selection circuit to enter the memory access request from the OS arithmetic processing unit, and a second set value which sets a capacity of a storage area in the data buffer for storing data corresponding to the memory access request from the OS arithmetic processing unit are set.

According to the first aspect, a ratio of memory access requests from the OS CPU core to memory access requests from the general-purpose CPU cores is set more flexibly and dynamically.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
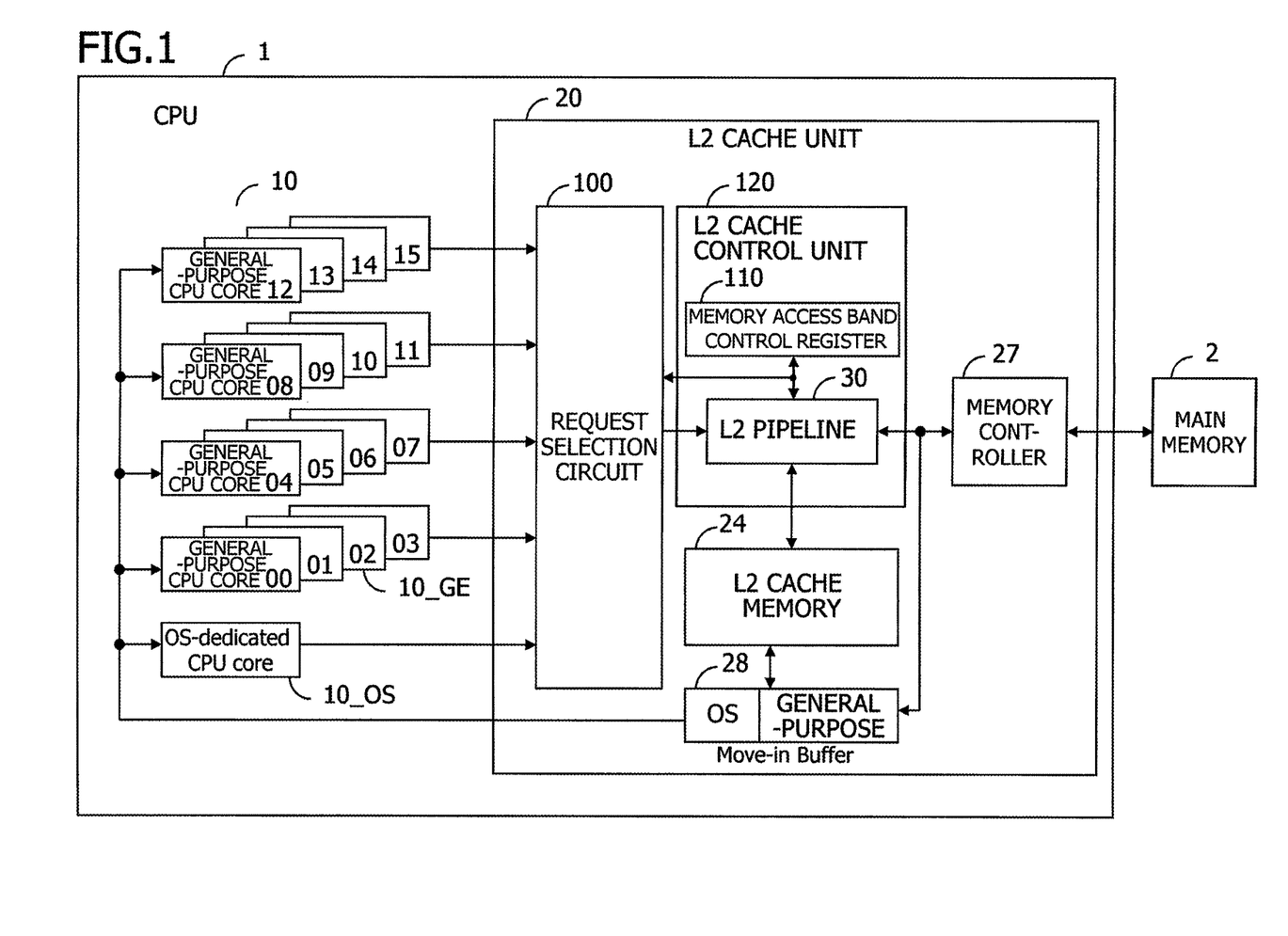
FIG. 1 is a diagram illustrating a configuration of a CPU chip (arithmetic processing apparatus) according to the present embodiment.

FIG. 1 is a diagram illustrating a configuration of a CPU chip (arithmetic processing apparatus) according to the present embodiment. The CPU chip 1 includes a CPU core group, which includes a plurality of CPU cores 10, and a level-2 (L2) cache unit 20 shared by the plurality of CPU cores, and further, the CPU chip 1 is configured to be accessible to an external main memory 2. Each of the plurality of CPU cores 10 includes one OS-dedicated CPU core 10_OS, which executes an instruction included in the OS, and a plurality of general-purpose CPU cores 10_GE each executing an instruction included in a program other than the OS. In the example depicted in FIG. 1, sixteen (16) general-purpose CPU cores are included.

Each of the plurality of CPU cores 10 includes a level-1 (L1) cache unit, an ALU (arithmetic logic unit), an arithmetic execution pipeline, a memory access request buffer, etc., as will be described later.

On the other hand, the L2 cache unit 20 includes a request selection circuit 100, which is shared by the plurality of CPU cores 10, for selecting a memory access request from each CPU core 10, an L2 cache control unit 120, an L2 cache memory 24 and a memory controller 27. The L2 cache memory 24 is a cache memory shared by the plurality of CPU cores 10. The L2 cache control unit 120 includes a L2 cache control pipeline (hereafter L2 pipeline) 30, which executes control related to a memory access request from the CPU core 10, a move-in buffer 28 and a memory access band control register 110. In the memory access control register 110, a variety of set values for controlling the frequency of memory access requests from the OS-dedicated CPU core 10_OS are set by a user program.

Based on a set value in the memory access band control register 110, the request selection circuit 100 selects one memory access request from among a memory access request from the OS-dedicated CPU core 10_OS and memory access requests from the general-purpose CPU cores 10_GE, to enter the selected memory access request to the L2 pipeline 30. Namely, the request selection circuit 100 is a request entering circuit for entering a memory access request to the L2 pipeline 30.

The L2 pipeline 30 processes the entered memory access request. For example, in regard to an access destination address in the entered memory access request, the L2 pipeline 30 checks a non-illustrated tag memory, so as to access the L2 cache memory 24 if the cache block of the access destination address is stored in the L2 cache memory 24, or request the memory controller 27 to perform a memory access to the main memory 2 if the cache block of interest is not stored in the L2 cache memory 24.

For example, when the memory access request is a move-in request, which is a readout request or a write request, the L2 pipeline 30 secures a needed area in the move-in buffer 28, and thereafter, if a hit occurs in the tag memory, the L2 pipeline 30 stores data in the corresponding cache block in the L2 cache memory 24 into the move-in buffer 28. On the other hand, in the case of a mishit, the L2 pipeline 30 issues a readout request to the memory controller 27, so as to store data being read out from the main memory 2 into the move-in buffer 28. The L2 pipeline 30 then transmits the data stored in the move-in buffer 28 to the CPU core 10 of a request source.

Also, when the memory access request is a move-out request, which is a write request of data in an L1 cache memory of a CPU core, the L2 pipeline 30 secures a needed area in a non-illustrated move-out buffer, and thereafter, temporarily stores the move-out data from the CPU core 10 into the move-out buffer, writes the data into the L2 cache memory 24, and stores tag information into the tag memory. When the memory access request is a move-out request which is a write request of data in the L2 cache memory 24, the L2 pipeline 30 temporarily stores the move-out data in the L2 cache memory 24 into the move-out buffer similarly to the above, to write into the main memory 2 through the memory controller 27.

According to the present embodiment, the set value of the memory access band control register 110 is set by a user program. Then, the request selection circuit 100 selects a memory access request from the OS-dedicated CPU core 10_OS on the basis of a first set value set in the memory access band control register 110, to enter into the L2 pipeline 30. The first set value is a set value that specifies a frequency of entering the memory access request from the OS-dedicated CPU core into the L2 pipeline 30. For example, the first set value includes the entry frequency of move-in request particularly from the OS-dedicated CPU core 10_OS among the memory access requests, and priority (whether or not to give priority) of the move-in request from the OS-dedicated CPU core over move-in requests from the general-purpose CPU cores 10_GE.

Further, based on a second set value, the L2 pipeline 30 controls the upper limit of an area in the move-in buffer 28 for temporarily storing data related to the move-in request from the OS-dedicated CPU core 10_OS and the upper limit of an area in the move-in buffer 28 for temporarily storing data related to each move-in request from the general-purpose CPU cores 10_GE, so as to control to secure each data storage area related to each memory access request within a range not exceeding each upper limit of the second set value.

With regard to the above first set value to control the request selection circuit 100 and the second set value to control each upper-limit capacity of the temporary storage areas for the OS-dedicated CPU core and the general-purpose CPU cores in the move-in buffer 28, it may be possible to use either one of the set values. However, by using both of the set values, the memory access request band for the OS-dedicated CPU core 10_OS is set with more precision. Thus, the user can control an optimal band flexibly and dynamically according to the state of the user program.

Figure 2:
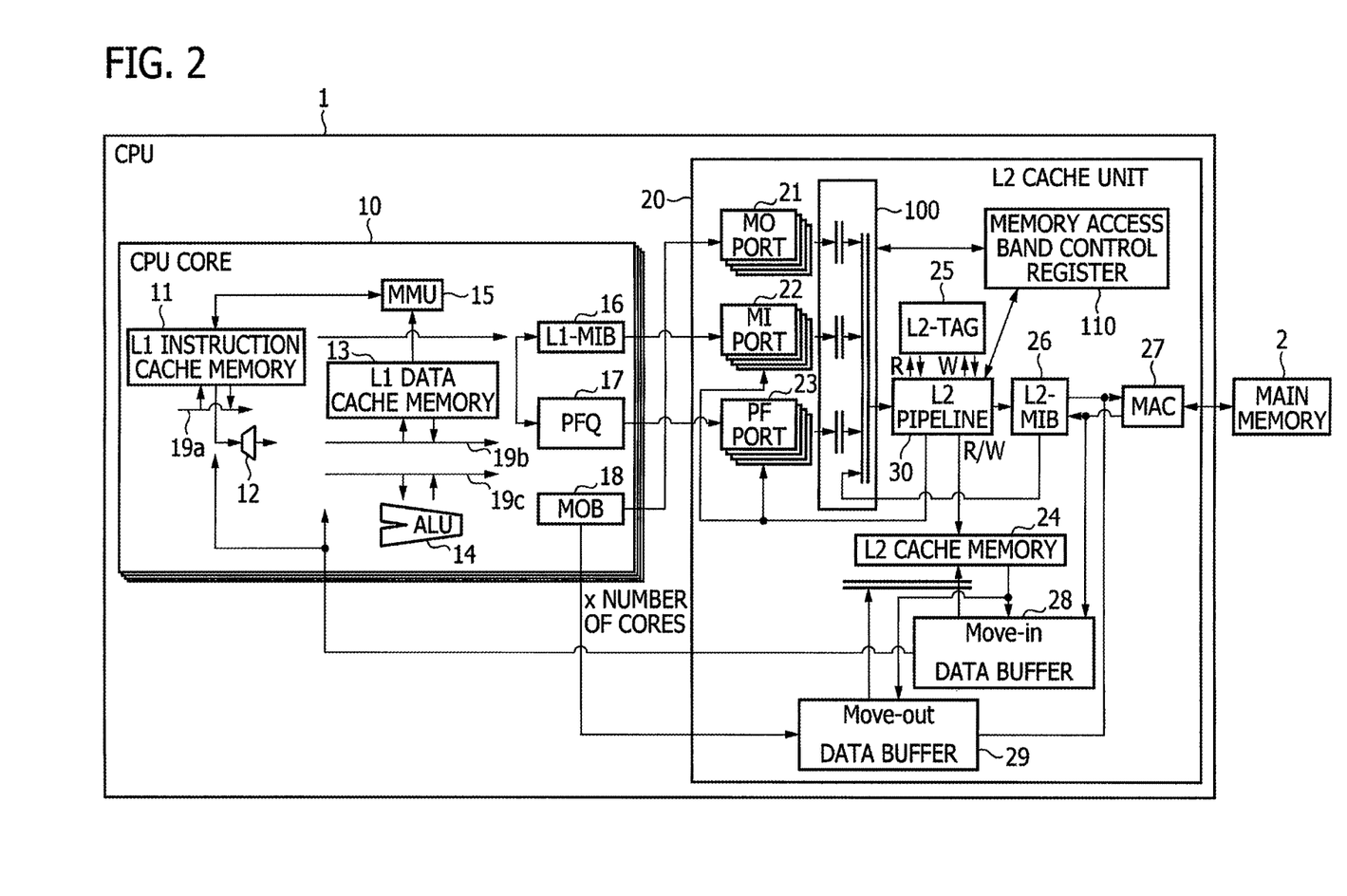
FIG. 2 is a diagram illustrating detailed configurations of the CPU core and the L2 cache unit in the CPU chip.

FIG. 2 is a diagram illustrating detailed configurations of the CPU core and the L2 cache unit in the CPU chip. As an example, a CPU chip 1 depicted in FIG. 2 includes four CPU cores 10, one of which is the OS-dedicated CPU core and the other three of which are the general-purpose CPU cores. The configurations of the four CPU cores 10 are the same.

Each CPU core 10 includes a level-1 (L1) instruction cache memory 11, an instruction decoder 12, which decodes an instruction read out from the instruction cache memory, an L1 data cache memory 13, an ALU (arithmetic logic unit) 14, which performs arithmetic operation and logic operation on the basis of each instruction issued by the instruction decoder 12, and a memory management unit (MMU) 15. Further, the CPU core 10 includes an L1 move-in buffer (L1-MIB) 16, a pre-fetch queue (PFQ) 17, a move-out buffer (MOB) 18, an instruction fetch pipeline 19a, a load/store pipeline 19b and an execution pipeline 19c.

The memory management unit 15 performs conversion from a virtual address to a physical address for a memory access request. The L1 move-in buffer 16 is a buffer for temporarily storing a move-in request to the L2 cache unit 20. The above move-in request is generated when a cache miss occurs in the L1 cache memories 11, 13 in the CPU core 10. The move-in request is a readout request or a write request to the cache memory 24 and the main memory 2.

The pre-fetch queue 17 is a buffer for temporarily storing a pre-fetch request up to the L2 cache memory 24. Also, the move-out buffer 18 is a buffer for temporarily storing a write-out (move-out) request for writing an instruction and data in the L1 cache memories 11, 13 to the L2 cache memory 24.

The instruction fetch pipeline 19a is a pipeline circuit for executing readout processing of the instruction from the L1 instruction cache memory 11. The load/store pipeline 19b is a pipeline circuit for executing load processing and store processing of data. Also, the execution pipeline 19c is a pipeline circuit for executing an instruction.

The L2 cache unit 20 is a secondary cache memory unit shared by four CPU cores 10. The L2 cache unit 20 includes: four move-in ports 22 respectively provided corresponding to four move-in buffers (L1-MIB) 16 provided corresponding to the respective four CPU cores 10; four pre-fetch ports 23 respectively provided corresponding to four pre-fetch queues (PFQ) 17; and four move-out ports 21 respectively provided corresponding to the four move-out buffers (MOB) 18. The request selection circuit 100 selects an access request waiting for its turn in each port 21, 22, 23 with a predetermined logic, to enter into the L2 pipeline 30.

The L2 cache unit 20 also includes an L2 cache memory 24, an L2 tag memory 25, and an L2 pipeline 30 for executing an entered access request, and further includes an L2 move-in buffer 26 for temporarily storing a move-in request and a pre-fetch request to the main memory 2, a memory access control unit 27 for controlling a memory access to the main memory 2, a move-in data buffer 28 for temporarily storing move-in request data, and a move-out data buffer 29 for temporarily storing move-out request data.

The L2 cache unit 20 further includes a memory access band control register 110. By the execution of a user program, a first and a second set value are set from the CPU core 10 to the memory access band control register 110.

Each move-out port 21 receives a move-out request (data write-out request), which is one type of memory accesses, from each corresponding move-out buffer 18, and selects each received move-out request in order from the earliest to the latest, to entry the move-out request to the request selection circuit 100.

Each move-in port 22 receives a move-in request (data readout request or data write request), which is one type of memory accesses, from each corresponding move-in buffer 18, and selects each received move-in request in order from the earliest to the latest, to entry the move-in request to the request selection circuit 100.

Further, each pre-fetch port 23 receives a pre-fetch request, which is one type of memory accesses, from each corresponding pre-fetch queue 17, and selects each received pre-fetch request in order from the earliest to the latest, to entry the pre-fetch request to the request selection circuit 100.

The request selection circuit 100 selects each access request entered from each port 21, 22, 23 and the L2 move-in buffer 26, to enter the request into the L2 pipeline 30. Then, according to the present embodiment, the request selection circuit 100 selects a move-in request from the OS-dedicated CPU core among move-in requests entered from the four move-in ports 22 on the basis of the first set value of the memory access band control register 110, to entire into the L2 pipeline 30.

The first set value includes an entry interval set value in which an interval of entering each move-in request from the OS-dedicated CPU core into the L2 pipeline 30 is set. The entry interval set value is a set value indicating that an entry into the L2 pipeline 30 is to be made at a frequency of, for example, once per 16 clock cycles. In that case, the request selection circuit 100 enters into the L2 pipeline 30 each move-in request from the general-purpose CPU cores in every clock cycle, whereas enters into the L2 pipeline 30 each move-in request from the OS-dedicated CPU core only once per 16 cycles. Therefore, each move-in request from the general-purpose CPU cores is entered 15 times out of 16 clock cycles into the L2 pipeline 30, if there is any move-in request entry from the OS-dedicated CPU core. On the other hand, each move-in request from the general-purpose CPU cores is entered every clock cycle if there is no move-in request entry from the OS-dedicated CPU core. Thus, it is possible to set to enter move-in requests from the OS-dedicated CPU core into the L2 pipeline 30 at a frequency set by the user.

In addition to the above-mentioned entry interval set value, the first set value includes a priority processing value indicating whether or not a move-in request from the OS-dedicated CPU core is to be entered preferentially over each move-in request from the general-purpose CPU cores. When the priority processing value has a value indicating that the move-in request from the OS-dedicated CPU core is to be handled preferentially over the move-in request from the general purpose CPU core, and if both move-in requests are entered, the request selection circuit 100 preferentially enters the move-in request from the OS-dedicated CPU core into the L2 pipeline 30. When the priority processing value has a value indicating not to be handled preferentially, the request selection circuit 100 preferentially selects a request entered earliest or successively selects each request from the four CPU cores.

By the use of both the entry interval set value and the priority processing value set in the first set value, it is possible to appropriately set the frequency of entries among move-in requests from the OS-dedicated CPU core and move-in request from the plurality of general-purpose CPU cores, and to set each memory access band of the OS-dedicated CPU core and the plurality of general-purpose CPU cores to a desired ratio.

The L2 pipeline 30 checks the L2 tag memory for an access destination address in regard to a move-in request entered, for example. If a cache hit occurs, the L2 pipeline 30 secures an area in the move-in buffer 28 and then, reads out data in the L2 cache memory 24 to temporarily store in the secured area in the move-in buffer 28. On the other hand, if a cache miss occurs, the L2 pipeline 30 secures an area in the move-in buffer 28 and then temporarily stores into the L2 move-in buffer 26 the move-in request to the main memory 2. In response thereto, the memory access controller 27 accesses the main memory 2 to read out data and temporarily store the data into the secured area in the move-in buffer 28. The data temporarily stored in the move-in buffer 28 is transmitted to the CPU core of a request source.

The L2 pipeline 30 allocates a temporary storage area in the move-in buffer 28 for an entered move-in request, until the temporary storage area in the move-in buffer 28 for data related to the move-in request from the OS-dedicated CPU core 10_OS reaches the upper limit value which is the second set value set in the memory access band control register 110. If the L2 pipeline 30 already allocates the storage area for the move-in request from the OS-dedicated CPU core up to the upper limit value, the L2 pipeline 30 no more allocates an area in the move-in buffer 28 for a new move-in request. When no area is allocated in the move-in buffer 28, the L2 pipeline 30 does not execute to read out data in the L2 cache memory 24 or data in the main memory 2. Thus, by means of the second set value, the user can restrict a band to a move-in request from the OS-dedicated CPU core. Accordingly, by the combination of the first set value with the second set value, the user sets an access request from the OS-dedicated CPU core with higher precision.

The L2 pipeline 30 checks the L2 tag memory also in regard to a move-out request entered. If a cache hit occurs, the L2 pipeline 30 secures an area in the move-out buffer 29 to store move-out data into the secured area and store the move-out data into the L2 cache memory 24. On the other hand, if a cache miss to the move-out request occurs, the L2 pipeline 30 secures an area in the move-out buffer 29, to store the move-out data into the secured area and write the move-out data into the L2 cache memory and the main memory 2.

When processing for the access request is completed normally, the L2 pipeline 30 transmits a completion notification to the move-in ports 22 and the pre-fetch ports 23, whereas when processing for the access request is aborted, the L2 pipeline 30 transmits an abort notification.

Figure 3:
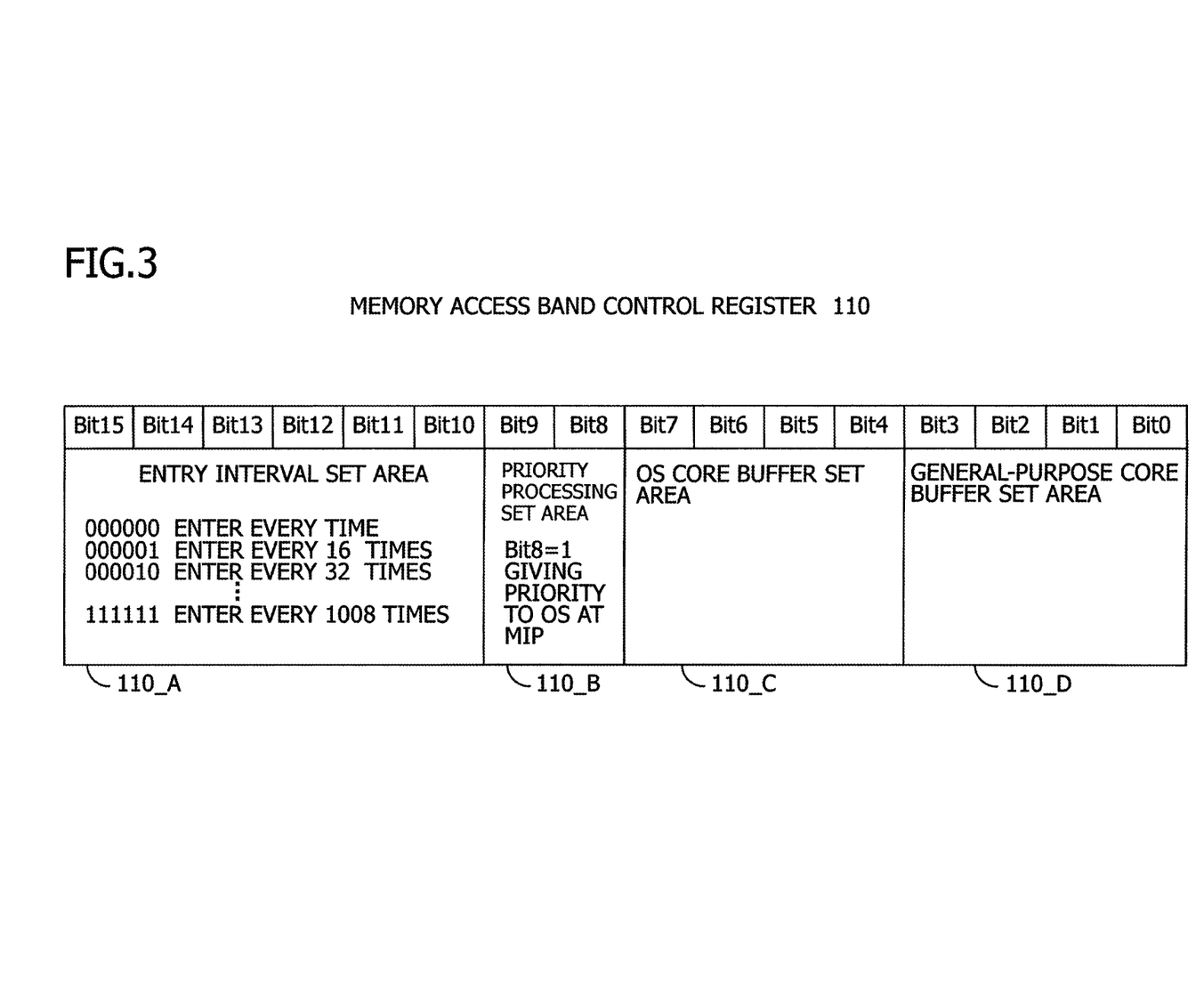
FIG. 3 is a diagram illustrating a configuration example of the memory access band control register.

FIG. 3 is a diagram illustrating a configuration example of the memory access band control register. The memory access band control register 110 is composed of 16 bits, for example. The memory access band control register 110 includes an entry interval set area 110_A in bits 10-15, a priority processing set area 110_B in bits 8-9, an OS core buffer set area 110_C in bits 4-7 and a general-purpose core buffer set area 110_D in bits 0-3, respectively.

To the entry interval set area 110_A, it is possible to set an interval composed of 6 bits to enter memory access requests from the OS-dedicated CPU core into the L2 pipeline 30. For example, as depicted in the figure, it is possible to set each entry frequency, such as every clock cycle as a maximum frequency, once per 16 clock cycles as a next largest frequency, once per 32 clock cycles, once per 1008 clock cycles as a minimum frequency, etc. The pitch of the frequency is appropriately selectable.

A 2-bit set value can be set to the priority processing set area 110_B. When "1" is set to bit 8, the request selection circuit 100 enters into the L2 pipeline 30 a move-in request from the OS-dedicated CPU core preferentially over each move-in request from the general-purpose CPU cores. When "1" is set to bit 9, for example, it may be possible for the request selection circuit to enter into the L2 pipeline 30 a pre-fetch request from the OS-dedicated core preferentially over each pre-fetch request from the general-purpose CPU cores.

A 4-bit set value can be set to the OS core buffer set area 110_C, in which it is possible to set the upper-limit capacity of a temporary storage area which is to be secured in the move-in buffer 28 for a move-in request from the OS-dedicated CPU core. Namely, the set value specifies the upper-limit capacity of the storage area in the move-in buffer 28 to be allocated dedicatedly to a move-in request from the OS-dedicated CPU core. If the above upper limit value is set larger, an access band for the move-in request from the OS-dedicated CPU core becomes larger.

A 4-bit set value can be set to the general-purpose core buffer set area 110_D, in which it is possible to set the upper-limit capacity of a temporary storage area to be secured in the move-in buffer 28 for each move-in request from the general-purpose CPU cores. This set value specifies the upper-limit capacity of the storage area in the move-in buffer 28 to be allocated dedicatedly to move-in requests from the general-purpose CPU cores.

Since the format of the memory access band control register 110 depicted in FIG. 3 is merely one example, other formats may be applicable.

Figure 4:
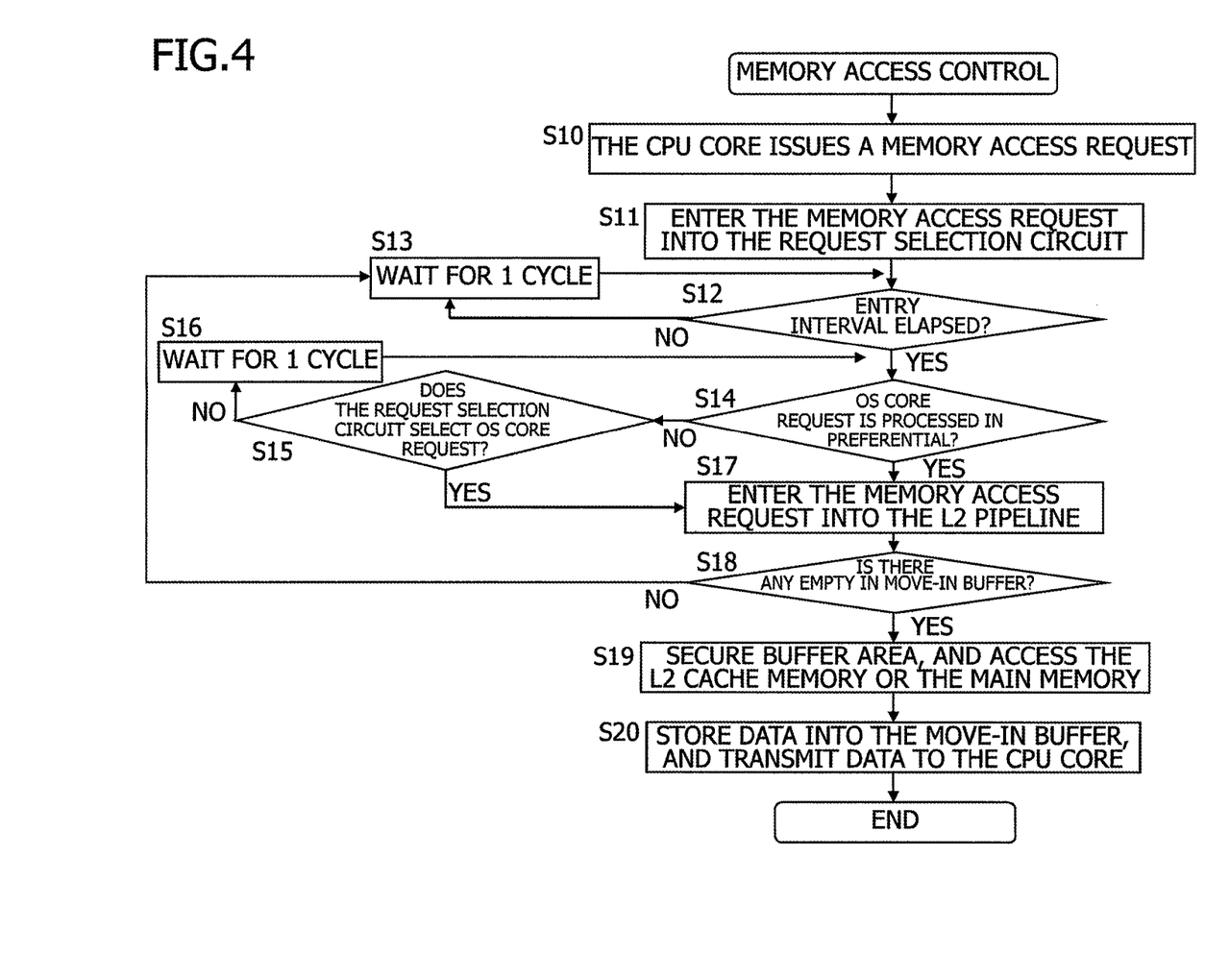
FIG. 4 is a flowchart illustrating processing in the L2 cache unit 20 for an memory access request, particularly a move-in request, from the OS-dedicated CPU core.

FIG. 4 is a flowchart illustrating processing in the L2 cache unit 20 for an memory access request, particularly a move-in request, from the OS-dedicated CPU core. In the following example, it is assumed that an entry interval into the L2 pipeline 30 from the OS-dedicated CPU core is set to be a desired interval, with the setting of preferentially processing an access request from the OS-dedicated CPU core over each access request from the general-purpose CPU cores, and the upper limit value of the temporary storage area in the move-in buffer 28 for an access request from the OS-dedicated CPU core is set to a desired value.

First, the OS-dedicated CPU core issues a memory access request, so as to store into the L1 move-in buffer 16 (S10). The memory access request is a move-in request, for example. The move-in request stored in the L1 move-in buffer 16 is then transmitted to a move-in port 22 in the L2 cache unit 20.

The move-in port 22 enters the received move-in request to the request selection circuit 100 in order of the reception (S11). Then, when clock cycles corresponding to the set entry interval already elapse (YES in S12) and when it is set to preferentially process a move-in request from the OS-dedicated CPU core (YES in S14), the request selection circuit 100 enters the move-in request into the L2 pipeline 30 at the highest priority (S17). Namely, when a move-in request from the OS-dedicated CPU core and a move-in request from each general-purpose CPU core are entered, the request selection circuit 100 refers to the entry interval set value and the priority processing set value in the access band control register 110. When the clock cycles corresponding to the set entry interval elapse and it is set to preferentially process the move-in request of the OS-dedicated CPU core, the request selection circuit 100 preferentially enters the move-in request from the OS-dedicated CPU core into the L2 pipeline 30, even if the move-in request from the general-purpose CPU core is entered.

The L2 pipeline 30 processes the move-in request, and checks whether or not the area in the move-in buffer 28 for temporarily storing move-in data for the OS-dedicated CPU core reaches the upper limit value, in other words, whether or not an idle or empty area exists (S18). If an idle or empty area exists (YES in S18), the L2 pipeline 30 secures in the move-in buffer 28 a buffer area for storing data, and accesses the L2 cache memory 24 or the main memory 2 (S19). Namely, the L2 pipeline 30 checks the tag memory 25, and if a cache hit occurs, the L2 pipeline 30 accesses the cache memory 24, whereas if a cache miss occurs, the L2 pipeline 30 accesses the main memory 2 through the memory controller 27.

Then, the L2 pipeline 30 stores data, read out from the L2 cache memory 24 or the main memory 2, into the area secured in advance in the move-in buffer 28, and transmits the data stored in the move-in buffer 28 to the OS-dedicated CPU core (S20).

In step S11, when a move-in request from the OS-dedicated CPU core is entered, if clock cycles corresponding to the set entry interval do not elapse (NO in S12), the move-in request is awaited for one clock cycle (S13) and reentered. Further, in step S14, if there is set a priority processing value indicating not to preferentially process a move-in request from the OS-dedicated CPU core (NO in S14), the request selection circuit 100 successively selects move-in requests from the OS-dedicated CPU core and the general-purpose CPU cores, to enter into the L2 pipeline. Thus, if the request selection circuit 100 selects a move-in request of the OS-dedicated CPU core (YES in S15), the request selection circuit 100 enters the request concerned into the L2 cache line (S17), whereas in the case of not selecting the move-in request (NO in S15), the request selection circuit 100 waits for one clock cycle (S16), to execute the decision of step S14 again.

Further, in step S18, if a dedicated area in the move-in buffer 28 to move-in requests from the in OS-dedicated CPU core reaches the upper-limit capacity (NO in S18), the memory access in step S19 is not executed. Instead, after waiting for one clock cycle (S13), the request selection circuit 100 decides again whether or not the move-in request is to be entered into the L2 pipeline 30. As such, if the upper-limit capacity of the dedicated area in the move-in buffer 28 is decreased, the access band can be narrowed, whereas if increased, the access band can be broadened.

In the above-mentioned embodiment, the OS-dedicated CPU core is a dedicated CPU core that executes OS instructions. However, a quite small part of the OS instructions may be executed by the general-purpose CPU cores. The reason is that the basic structures are the same between the OS-dedicated CPU core and the general-purpose CPU cores.

In the above-mentioned embodiment, control to enter into the L2 pipeline 30 either one of move-in requests from the OS-dedicated CPU core and the general-purpose CPU cores is executed, according to the first and second set values in the access band control register 110. However, it may also be possible to control to enter into the L2 pipeline 30 one of pre-fetch requests from the OS-dedicated CPU core and the general-purpose CPU cores, according to the first and second set values in the access band control register 110.

According to the present embodiment, a desired frequency of entering a memory access from the OS-dedicated CPU core into the L2 pipeline 30 can be set to the access band control register 110 from a user program. Therefore, it is possible to set each frequency of memory access requests from the OS-dedicated CPU core and the general-purpose CPU cores to a desired frequency. In order to set to the desired frequency, an entry interval to the L2 cache unit shared by the plurality of CPU cores, an indication of whether or not an access request from the OS-dedicated CPU core is to be processed preferentially and the upper limit value of a securable area in the move-in buffer 28 are set in the access band control register by a user program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising:
    an OS arithmetic processing unit which executes an instruction included in an Operating System;
    a plurality of general-purpose arithmetic processing units each executing an instruction included in a program other than the Operating System;
    a shared cache unit that includes a shared cache memory, which is shared among the plurality of general-purpose arithmetic processing units and the OS arithmetic processing unit, a cache control unit, a request entering circuit which enters memory access requests from the plurality of general-purpose arithmetic processing units and the OS arithmetic processing unit into the cache control unit, and a data buffer which temporarily stores read data that is read from the shared cache memory or a main memory in response to the memory access request that is entered, until the read data stored in the data buffer is transmitted to the OS arithmetic processing unit or one of the plurality of general-purpose arithmetic processing units; and
    a memory access control unit which controls a memory access to the main memory,
    wherein the shared cache unit further has a memory access band control register to which a capacity set value which sets a capacity of a storage area in the data buffer for storing the read data corresponding to the memory access request from the OS arithmetic processing unit is set,
    the cache control unit allocates the storage area for storing the read data corresponding to the memory access request from the OS arithmetic processing unit in the data buffer to the extent of an upper-limit capacity of the capacity set value, in response to the entering of the memory access request from the OS arithmetic processing unit,
    when the storage area for storing the read data is allocated in the data buffer, the cache control unit executes the memory access request to the shared cache memory or issues the memory access request to the memory access control unit and temporarily stores the read data that is read from the shared cache memory or the main memory in response to the memory access request that is entered in the allocated storage area in the data buffer,
    when the storage area for storing the read data is not allocated in the data buffer, the cache control unit does not execute the memory access request to the shared cache memory or issue the memory access request to the memory access control unit.

2. The arithmetic processing apparatus according to claim 1,
    wherein the capacity set value includes the upper-limit capacity of the storage area in the data buffer for storing the read data corresponding to the memory access request from the OS arithmetic processing unit, and
    the cache control unit allocates the storage area for storing data corresponding to the memory access request from the OS arithmetic processing until reaching the upper-limit capacity.

3. The arithmetic processing apparatus according to claim 2,
    wherein the memory access request includes a move-in request to read out data in the shared cache memory or the main memory and a move-out request to write data in the cache memory of the arithmetic processing unit into the shared cache memory, and
    the cache control unit allocates the storage area for storing data corresponding to the move-in request among the memory access requests from the OS arithmetic processing unit until reaching the upper-limit capacity.

4. A control method for an arithmetic processing apparatus including:
    an OS arithmetic processing unit which executes an instruction included in an Operating System;
    a plurality of general-purpose arithmetic processing units each executing an instruction included in a program other than the Operating System;
    a shared cache unit that includes a shared cache memory, which is shared among the plurality of general-purpose arithmetic processing units and the OS arithmetic processing unit, a cache control unit, a request entering circuit which enters memory access requests from the plurality of general-purpose arithmetic processing units and the OS arithmetic processing unit into the cache control unit, and a data buffer which temporarily stores data corresponding to the memory access request; and
    a memory access control unit which controls a memory access to a main memory,
    the control method comprising:
    setting, to a memory access band control register, a capacity set value which sets a capacity of a storage area in the data buffer for temporarily storing the data corresponding to the memory access request from the OS arithmetic processing unit;

allocating, by the cache control unit, the storage area for temporarily storing the data corresponding to the memory access request from the OS arithmetic processing unit in the data buffer to the extent of an upper-limit capacity of the capacity set value, in response to the entering of the memory access request from the OS arithmetic processing unit;

when the storage area for storing the data is allocated in the data buffer, by the cache control unit, executing the memory request to the shared cache memory or issuing the memory access request to the memory access control unit and temporarily storing read data that is read from the shared cache memory or the main memory in response to the memory access request that is entered in the allocated storage area in the data buffer, until the read data stored in the data buffer is transmitted to the OS arithmetic processing unit; and when the storage area for storing the data is not allocated in the data buffer, by the cache control unit, not executing the memory request to the shared cache memory nor issuing the memory access request to the memory access control unit.

5. An arithmetic processing apparatus comprising:

an OS arithmetic processing unit which executes an instruction included in an Operating System;

a plurality of general-purpose arithmetic processing units each executing an instruction included in a program other than the Operating System;

a shared cache unit that includes a shared cache memory which is shared among the plurality of general-purpose arithmetic processing units and the OS arithmetic processing unit, a cache control unit, request selection circuit which selects either a memory access request from the plurality of general-purpose arithmetic processing units or a memory access request from the OS arithmetic processing unit to enter into the cache control unit, and a data buffer which temporarily stores read data that is read from the shared cache memory or a main memory in response to the memory access request that is entered, until the read data stored in the data buffer is transmitted to the OS arithmetic processing unit or one of the plurality of general-purpose arithmetic processing units; and a memory access control unit which controls a memory access to a main memory, wherein the shared cache unit further has a memory access band control register to which a first set value which includes an entry criterion for the request selection circuit to enter the memory access request from the OS arithmetic processing unit is set, on the basis of the first set value, the request selection circuit selects the memory access request from the OS arithmetic processing unit to enter into the cache control unit, and the cache control unit processes the memory access request from the plurality of general-purpose arithmetic processing units and the memory access request from the OS arithmetic processing unit, which are entered by the request selection circuit, to access the shared cache memory and the main memory.

6. The arithmetic processing apparatus according to claim 5, wherein the first set value includes one or both of a frequency of entering the memory access request from the OS arithmetic processing unit into the cache control unit and priority of the memory access request from the OS arithmetic processing unit over the memory access request from the general-purpose arithmetic processing unit.

7. The arithmetic processing apparatus according to claim 6, wherein the memory access request includes a move-in request to read out data in the shared cache memory or the main memory and a move-out request to write data in the cache memory of the arithmetic processing unit into the shared cache memory, and the first set value includes either one or both of an entry frequency and priority in regard to the move-in request.

* * * * *